United States Patent
Hashimoto et al.

(10) Patent No.: US 11,438,671 B2
(45) Date of Patent: Sep. 6, 2022

(54) SIGNAL CONFIGURATION DEVICE, SIGNAL CONFIGURATION SYSTEM, SIGNAL CONFIGURATION METHOD, AND STORAGE MEDIUM STORING SIGNAL CONFIGURATION PROGRAM

(71) Applicant: NEC CORPORATION, Tokyo (JP)

(72) Inventors: Kiyoshi Hashimoto, Kanagawa (JP); Gouhei Shinbo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 845 days.

(21) Appl. No.: 16/065,310

(22) PCT Filed: Dec. 22, 2016

(86) PCT No.: PCT/JP2016/088349
§ 371 (c)(1),
(2) Date: Jun. 22, 2018

(87) PCT Pub. No.: WO2017/111002
PCT Pub. Date: Jun. 29, 2017

(65) Prior Publication Data
US 2021/0168467 A1    Jun. 3, 2021

(30) Foreign Application Priority Data
Dec. 24, 2015    (JP) .............................. JP2015-251861

(51) Int. Cl.
H04N 21/81    (2011.01)
H04N 21/236    (2011.01)
H04N 21/488    (2011.01)

(52) U.S. Cl.
CPC ..... H04N 21/814 (2013.01); H04N 21/23614 (2013.01); H04N 21/4882 (2013.01)

(58) Field of Classification Search
CPC ......... H04N 21/6332; H04N 21/23614; H04N 21/2383; H04N 21/814; H04N 21/236; H04N 21/262; H04N 21/438
See application file for complete search history.

(56) References Cited

U.S. PATENT DOCUMENTS 5,065,398 A * 11/1991 Takashima ............. H04B 7/212
                                                               370/230
5,379,320 A *  1/1995 Fernandes ................ H01Q 3/14
                                                               375/141

(Continued)

FOREIGN PATENT DOCUMENTS

JP         06-204942 A      7/1994
JP      2001-308813 A     11/2001

(Continued)

OTHER PUBLICATIONS

Communication dated Sep. 24, 2019, from the Japanese Patent Office in counterpart Application No. 2018-225469.

(Continued)

Primary Examiner — Jason Salce
(74) Attorney, Agent, or Firm — Sughrue Mion, PLLC

(57) ABSTRACT

[Problem] To provide a signal configuration device, a signal configuration system, a signal configuration method, and a storage medium storing a signal configuration program which enable quickly transmitting data that corresponds to an emergency alert signal. [Solution] This signal configuration device 12 includes an information generating unit 21. The information generating unit 21 corresponds to a TMCC information generating unit 121 in the first embodiment shown in FIG. 2. The information generating unit 21 generates a transmission frame in which each of the multiple slots configuring the frame includes an activation control signal corresponding to whether or not an emergency alert is being broadcast.

15 Claims, 10 Drawing Sheets

| Byte | bit | SYNTAX | EXPLANATION |
|---|---|---|---|
| 0 | 7-0 | SYNCHRONIZING SIGNAL (23..16bit) | FRAME HEAD SLOT INDICATES "FRAME SYNCHRONIZATION (Fsync)=52F886h" |
| 1 | 7-0 | SYNCHRONIZING SIGNAL (15..8bit) | THE OTHER SLOTS INDICATE "SLOT SYNCHRONIZATION (Ssync)=96715Ah" |
| 2 | 7-0 | SYNCHRONIZING SIGNAL (7..0bit) | |
| 3 | 7-0 | RESERVE | SET '11111111' |
| 4 | 7-4 | TRANSMISSION MODE INFORMATION FOR EACH SLOT | INDICATE TRANSMISSION MODE OR THE LIKE IN WHICH THE SLOT IS TRANSMITTED. '0000': SLOT NOT IN ANY OF TRANSMISSION MODES 1 TO 8 '0001'- SLOT IN TRANSMISSION MODE 1 '0010'- SLOT IN TRANSMISSION MODE 2 '0011'- SLOT IN TRANSMISSION MODE 3 '0100'- SLOT IN TRANSMISSION MODE 4 '0101'- SLOT IN TRANSMISSION MODE 5 '0110'- SLOT IN TRANSMISSION MODE 6 '0111'- SLOT IN TRANSMISSION MODE 7 '1000'- SLOT IN TRANSMISSION MODE 8 '1001' to '1111', RESERVED |
| | 3-0 | SLOT ATTRIBUTE | INDICATE SLOT ATTRIBUTE OF THE SLOT. '0000' INVALID SLOT (= DUMMY SLOT) '0001' VALID SLOT '0010' to '1111'- RESERVED |
| | 7 | FRAME HEAD FLAG | IDENTIFY FRAME HEAD. '1' AT THE FRAME HEAD SLOT, AND '0' OTHERWISE. |
| 5 | 6-0 | SLOT COUNTER | COUNTER TO SET "0" TO THE FRAME HEAD SLOT, AND TO INCREMENT ONE BY ONE IN THE ORDER OF THE SLOTS. INCREMENTING IS PERFORMED FOR INVALID SLOTS TOO. ('0000000' TO '1110111') |

(56) References Cited

U.S. PATENT DOCUMENTS

| | | | |
|---|---|---|---|
| 6,522,635 B1* | 2/2003 | Bedwell | H04B 7/18528 370/314 |
| 9,485,110 B2* | 11/2016 | Kim | H04L 69/22 |
| 2002/0003773 A1* | 1/2002 | Okada | H04L 5/06 370/208 |
| 2002/0015400 A1* | 2/2002 | Morinaga | H04N 21/4325 370/345 |
| 2005/0159174 A1* | 7/2005 | Bar-On | H04W 64/00 455/456.6 |
| 2006/0146740 A1* | 7/2006 | Sheynman | H04L 63/0428 370/312 |
| 2007/0021099 A1* | 1/2007 | Sato | H04H 20/59 455/404.1 |
| 2007/0204291 A1* | 8/2007 | Ichihashi | H04N 5/4401 725/33 |
| 2007/0275682 A1* | 11/2007 | Adachi | H04H 20/426 455/185.1 |
| 2008/0209466 A1* | 8/2008 | Ishida | H04N 21/435 725/33 |
| 2008/0247366 A1* | 10/2008 | Celentano | H04W 8/005 370/338 |
| 2010/0118741 A1* | 5/2010 | Youn | H04W 72/1242 370/259 |
| 2010/0166008 A1* | 7/2010 | Hashimoto | H04L 27/38 370/458 |
| 2010/0290561 A1 | 11/2010 | Ko et al. | |
| 2011/0124312 A1* | 5/2011 | Kwon | H04W 76/50 455/404.2 |
| 2013/0094617 A1* | 4/2013 | Shirosugi | H04N 21/4348 375/340 |
| 2014/0167957 A1* | 6/2014 | Tsuji | G08B 21/24 340/539.13 |
| 2014/0292537 A1* | 10/2014 | Huang | H04J 3/1694 340/870.13 |
| 2016/0278126 A1* | 9/2016 | Matsuo | H04W 72/0446 |
| 2018/0006747 A1* | 1/2018 | Yamakage | H04L 29/08756 |

FOREIGN PATENT DOCUMENTS

| | | |
|---|---|---|
| JP | 2003-037573 A | 2/2003 |
| JP | 2008-148295 A | 6/2008 |
| JP | 2008-148296 A | 6/2008 |
| JP | 2009-135592 A | 6/2009 |
| JP | 2010-268226 A | 11/2010 |
| JP | 2011-254553 A | 12/2011 |
| JP | 2013-153305 A | 8/2013 |
| JP | 2015-2355 A | 1/2015 |
| JP | 2016-174299 A | 9/2016 |
| WO | 2015/023098 A1 | 2/2015 |

OTHER PUBLICATIONS

Japanese Office Action for JP Application No. 2019-191973 dated Dec. 8, 2020 with English Translation.

Communication dated Jul. 11, 2019, from the European Patent Office in counterpart European Application No. 16878889.1.

Kodo Kotaiiki Eisei Digital Hoso no Denso Hosiki Hyojun Kikaku Arib STD-B44, 1.0 th edition, Tokyo: Association of Radio Industries and Businesses, Jul. 29, 2009 (Jul. 29, 2009), pp. 7, 1st paragraph, fig.. 1-1, 129 pages.

BS/Kotaiiki CS Digital Hoso Un'yo Kitei Gijutsu Shiryo ARIB TR-B15 (separate vol. 3), 4.6 th edition, Tokyo: Association of Radio Industries and Businesses, Sep. 25, 2008 (Sep. 25, 2008), pp. 7-23 to 7-29, 437 pages.

International Search Report of PCT/JP2016/088349 dated Mar. 14, 2017 [PCT/ISA/210].

Written Opinion of PCT/JP2016/088349 dated Mar. 14, 2017 [PCT/ISA/237].

International Preliminary Report on Patentability dated Nov. 1, 2017 in PCT/JP2016/088349.

Notification of Reasons for Refusal dated Oct. 30, 2018 issued by the Japanese Patent Office in counterpart application No. 2018-013966.

Japanese Office Communication for JP Application No. 2020-215151 dated Oct. 26, 2021 with English Translation.

* cited by examiner

Fig. 4A

| Byte | bit | SYNTAX | EXPLANATION |
|---|---|---|---|
| 0 | 7-0 | SYNCHRONIZING SIGNAL(23..16bit) | FRAME HEAD SLOT INDICATES "FRAME SYNCHRONIZATION (Fsync)=52F886h" THE OTHER SLOTS INDICATE "SLOT SYNCHRONIZATION (Ssync)=36715Ah" |
| 1 | 7-0 | SYNCHRONIZING SIGNAL(15..8bit) | |
| 2 | 7-0 | SYNCHRONIZING SIGNAL(7..0bit) | |
| 3 | 7-0 | RESERVE | SET '11111111' |
| 4 | 7-4 | TRANSMISSION MODE INFORMATION FOR EACH SLOT | INDICATE TRANSMISSION MODE OR THE LIKE IN WHICH THE SLOT IS TRANSMITTED. '0000': SLOT NOT IN ANY OF TRANSMISSION MODES 1 TO 8 '0001': SLOT IN TRANSMISSION MODE 1 '0010': SLOT IN TRANSMISSION MODE 2 '0011': SLOT IN TRANSMISSION MODE 3 '0100': SLOT IN TRANSMISSION MODE 4 '0101': SLOT IN TRANSMISSION MODE 5 '0110': SLOT IN TRANSMISSION MODE 6 '0111': SLOT IN TRANSMISSION MODE 7 '1000': SLOT IN TRANSMISSION MODE 8 '1001' to '1111' : RESERVED |
| 4 | 3-0 | SLOT ATTRIBUTE | INDICATE SLOT ATTRIBUTE OF THE SLOT. '0000' INVALID SLOT (= DUMMY SLOT) '0001' VALID SLOT '0010' to '1111' : RESERVED |
| 5 | 7 | FRAME HEAD FLAG | IDENTIFY FRAME HEAD. '1' AT THE FRAME HEAD SLOT, AND '0' OTHERWISE. |
| 5 | 6-0 | SLOT COUNTER | COUNTER TO SET "0" TO THE FRAME HEAD SLOT, AND TO INCREMENT ONE BY ONE IN THE ORDER OF THE SLOTS. INCREMENTING IS PERFORMED FOR INVALID SLOTS TOO. ('0000000' TO '1110111') |

Fig. 4B

| Byte | bit | SYNTAX | EXPLANATION |
|---|---|---|---|
| 6 | 7-0 | POINTER/SLOT INFORMATION TOP POINTER (8 HIGHEST-RANK bits) | INDICATE FIRST PACKET HEAD POSITION OF THE SLOT, EXCEPT THAT 0xFFFF AT TOP POINTER INDICATES ABSENCE OF HEAD BYTE. |
| 7 | 7-0 | POINTER/SLOT INFORMATION TOP POINTER (8 LOWEST-RANK bits) | |
| 8 | 7-0 | POINTER/SLOT INFORMATION LAST POINTER (8 HIGHEST-RANK bits) | INDICATE VALUE RESULTING BY ADDING 1 TO NUMBER OF BYTES FROM SLOT HEAD, EXCLUDING FINAL BYTE HEADER OF FINAL POSITIONING COMPLETED PACKET IN CORRESPONDING SLOT, EXCEPT THAT 0xFFFF AT LAST POINTER INDICATES ABSENCE OF FINAL BYTE. |
| 9 | 7-0 | POINTER/SLOT INFORMATION LAST POINTER (8 LOWEST-RANK bits) | |
| 10 | 7-0 | SWITCH CONTROL SIGNAL | INDICATE CONCLUDING STATUS OF POSITIONING COMPLETED PACKET IN CORRESPONDING SLOT. PACKET CONCLUSION MEANS POSITIONING IN WHICH A PACKET IS NOT IN A PLURALITY OF SLOTS. IF THE PACKET IS CONCLUDED, SWITCHING OF TLV TRANSMISSION PACKET IS POSSIBLE FROM BEGINNING OF NEXT SLOT (DETAILED SEPARATELY). |
| 11 | 7 | START CONTROL SIGNAL | USED TO START RECEIVER AT THE TIME OF EMERGENCY WARNING BROADCAST. SET 1 DURING EMERGENCY WARNING BROADCAST, AND SET 0 NORMALLY. |
| | 6-4 | UPLINK CONTROL INFORMATION | SIDE DIVERSITY IMPLEMENTATION FRAME INSTRUCTION AND MAIN AND SUB STATIONS INSTRUCTION (JUST AS ARIB-STD-B44) |
| | 3 | UNDEFINED | SET '0' |
| | 2 | UNDEFINED | SET '0' |
| | 1 | UNDEFINED | SET '0'. |
| | 0 | UNDEFINED | SET '0' |
| 12 | 7-0 | RESERVED | SET '1111111'. |
| 13 | 7-0 | RESERVED | SET '1111111'. |

Fig. 4C

| Byte | bit | SYNTAX | EXPLANATION |
|---|---|---|---|
| 14 | 7-4 | MODULATION SYSTEM OF TRANSMISSION MODE 1 | INDICATE MODULATION SYSTEM OF TRANSMISSION MODE 1 IN SLOT LICENSED TO THE BROADCAST ORGANIZATION. HAS FORMAT SIMILAR TO THAT OF TMCC. |
| | 3-0 | CODED RATE OF TRANSMISSION MODE 1 | INDICATE CODED RATE OF TRANSMISSION MODE 1 IN SLOT LICENSED BY THE BROADCAST ORGANIZATION. HAS FORMAT SIMILAR TO THAT OF TMCC. |
| 15 | 7-0 | NUMBER OF ALLOCATED SLOTS FOR TRANSMISSION MODE 1 | INDICATE NUMBER OF ALLOCATED SLOTS FOR TRANSMISSION MODE 1 IN SLOT LICENSED TO THE BROADCAST ORGANIZATION. HAS FORMAT SIMILAR TO THAT OF TMCC. |
| 16 ~ 27 | | | INDICATE MODULATION SYSTEM/CODED RATE/NUMBER OF ALLOCATED SLOTS OF TRANSMISSION MODES 2 TO 7 IN SLOT LICENSED TO THE BROADCAST ORGANIZATION. |
| 28 | 7-4 | MODULATION SYSTEM OF TRANSMISSION MODE 8 | INDICATE MODULATION SYSTEM OF TRANSMISSION MODE 8 IN SLOT LICENSED TO THE BROADCAST ORGANIZATION. HAS FORMAT SIMILAR TO THAT OF TMCC. |
| | 3-0 | CODED RATE OF TRANSMISSION MODE 8 | INDICATE CODED RATE OF TRANSMISSION MODE 8 IN SLOT LICENSED TO THE BROADCAST ORGANIZATION. HAS FORMAT SIMILAR TO THAT OF TMCC. |
| 29 | 7-0 | NUMBER OF ALLOCATED SLOTS FOR TRANSMISSION MODE 8 | INDICATE NUMBER OF ALLOCATED SLOTS FOR TRANSMISSION MODE 8 IN SLOT LICENSED TO THE BROADCAST ORGANIZATION. HAS FORMAT SIMILAR TO THAT OF TMCC. |
| 30 | 7-0 | TRANSMISSION STREAM ID (8 HIGHEST-RANK bits) | INDICATE TRANSMISSION STREAM ID ON WHICH THE SLOT IS TRANSMITTED. |
| 31 | 7-0 | TRANSMISSION STREAM ID (8 LOWEST-RANK bits) | |
| 32 | 7-0 | RESERVE | SET '11111111'. |
| 33 | 7-0 | RESERVE | SET '11111111' |
| 34 | 7-0 | RESERVE | SET '11111111'. |

SIGNAL CONFIGURATION DEVICE, SIGNAL CONFIGURATION SYSTEM, SIGNAL CONFIGURATION METHOD, AND STORAGE MEDIUM STORING SIGNAL CONFIGURATION PROGRAM

CROSS REFERENCE TO RELATED APPLICATIONS

This application is a National Stage of International Application No. PCT/JP2016/088349, filed Dec. 22, 2016, claiming priority based on Japanese Patent Application No. 2015-251861, filed Dec. 24, 2015, the contents of all of which are incorporated herein by reference in their entirety.

TECHNICAL FIELD

The present invention relates to a signal configuration apparatus, a signal configuration system, a signal configuration method, and a signal configuration program, which are used to transmit data.

BACKGROUND ART

Occasionally, emergency warning broadcast is conducted in television broadcast. Broadcast stations transmit an emergency warning signal when conducting emergency warning broadcast. The receiver having received a transmitted emergency warning signal reports issuance of emergency warning.

When emergency warning broadcast is conducted in digitalized television broadcast, data corresponding to the emergency warning signal are transmitted.

PTL 1 describes a reception apparatus that reports issuance of emergency warning when emergency warning broadcast is conducted in digitalized television broadcast.

PTL 2 describes an apparatus that transmits transmission and multiplexing configuration control (TMCC) basic information containing an emergency bit that can be used in emergency across one super frame.

Note that the operational rule (association of radio industries and businesses (ARIB) TR-B15) is prescribed for emergency warning broadcast in broadcasting satellite (BS)/broadband communications satellite (CS) digital broadcast.

In addition, the standard specification (ARIB STD-B44) is prescribed for emergency warning broadcast in advanced broadband satellite digital broadcast.

CITATION LIST

Patent Literature

[PTL 1] Japanese Unexamined Patent Application Publication No. 2013-153305
[PTL 2] Japanese Unexamined Patent Application Publication No. 2003-37573

SUMMARY OF INVENTION

Technical Problem

Emergency warning broadcast is to encourage evacuation or the like of the viewers. Therefore, audio and images in such emergency warning broadcast are desirably output as promptly as possible. To output the audio and images in such emergency warning broadcast as promptly as possible, data corresponding to an emergency warning signal should be accordingly transmitted as promptly as possible, in digitalized television broadcast.

However, in an apparatus described in PTL 2 based on the operational rule of TR-B15, the same TMCC basic information is transmitted across one super frame. Therefore, while processing is performed related to transmission of one super frame to which an emergency bit, which is set when conducting emergency warning broadcast, is not set, when it becomes necessary to transmit TMCC basic information to which an emergency bit is set, the TMCC basic information to which an emergency bit is set has to be transmitted by being incorporated in the super frame after the super frame to which an emergency bit is not set. This means that it takes about 11 msec, which corresponds to a transmission time of one super frame, to transmit TMCC basic information to which an emergency bit is set. In view of the above, it is desirable to transmit TMCC basic information to which an emergency bit is set, more promptly.

In addition, in the standard specification of STD-B44, TMCC information containing a start control signal corresponding to a start of emergency warning broadcast is only included in the first to 24th slots. Therefore, in the case of attempting to start emergency warning broadcast during transmission of the signal corresponding to the 25th to 120th slots, the emergency warning broadcast cannot be started until next time a signal transmission corresponding to the first slot starts, which prevents prompt start of emergency warning broadcast. This means that it takes about 33 msec, which corresponds to a transmission time of one frame, to transmit TMCC basic information to which an emergency bit is set. In view of the above, it is desirable to transmit TMCC basic information to which an emergency bit is set, more promptly.

In view of this, the present invention has an objective of providing a signal configuration apparatus, a signal configuration system, a signal configuration method, and a signal configuration program, in accordance with which data corresponding to an emergency warning signal can be transmitted as promptly as possible.

Solution to Problem

A signal configuration apparatus, according to the present invention, comprises:
information generating means for generating a frame to be transmitted so that each of a plurality of slots constituting the frame to be transmitted contains a start control signal corresponding to whether emergency warning broadcast is being conducted.

A signal configuration system, according to the present invention, comprises:
the signal configuration apparatus according to any one of aspects; and
a multiplexer that multiplexes a plurality of input signals on each other and inputs the multiplexed input signals to the signal configuration apparatus.

A signal configuration method, according to the present invention, comprises:
an information generating step for generating a frame to be transmitted so that each of a plurality of slots constituting the frame to be transmitted contains a start control signal corresponding to whether emergency warning broadcast is being conducted.

A signal configuration program, according to the present invention, being for a computer to execute:

information generating processing for generating a frame to be transmitted so that each of a plurality of slots constituting the frame to be transmitted contains a start control signal corresponding to whether emergency warning broadcast is being conducted; and error correction processing for adding a code for error correction to the frame.

Advantageous Effects of Invention

The present invention realizes transmission of data corresponding to an emergency warning signal as promptly as possible.

BRIEF DESCRIPTION OF DRAWINGS

FIG. 4A is an explanatory drawing illustrating content of TMCC basic information.

FIG. 4B is an explanatory drawing illustrating content of TMCC basic information.

FIG. 4C is an explanatory drawing illustrating content of TMCC basic information.

DESCRIPTION OF EMBODIMENTS

Example Embodiment 1

Figure 1:
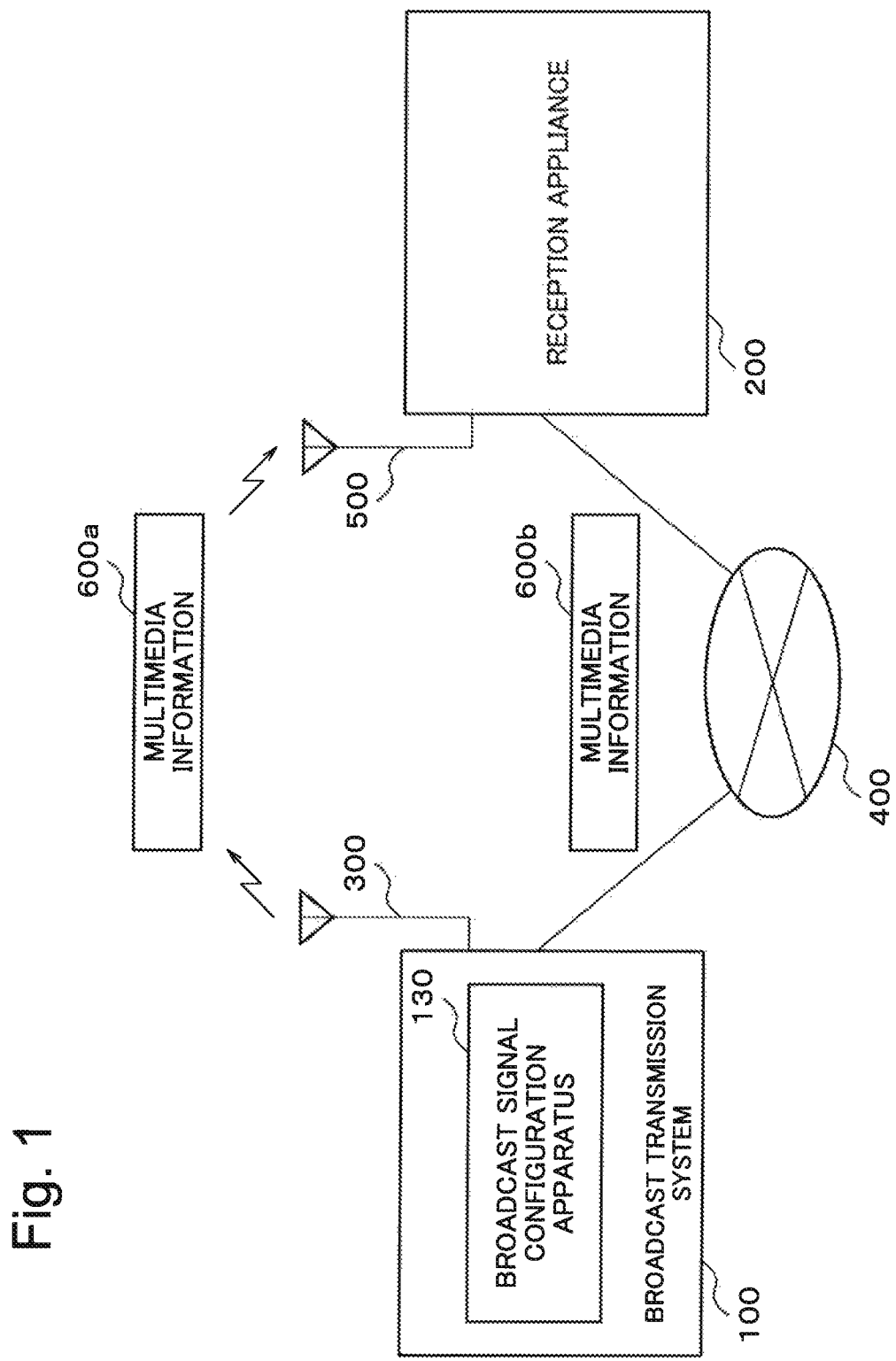
FIG. 1 is a block diagram illustrating an exemplary operation of a broadcast signal configuration apparatus according to a first example embodiment of the present invention.

With reference to the drawings, the following explains a broadcast signal configuration apparatus 130 according to the first example embodiment of the present invention. FIG. 1 is a block diagram illustrating an exemplary operation of the broadcast signal configuration apparatus 130 according to the first example embodiment of the present invention. As illustrated in FIG. 1, the broadcast signal configuration apparatus 130 according to the first example embodiment of the present invention is contained in a broadcast transmission system 100 that transmits multimedia information 600a via an antenna 300 by means of radio waves. In addition, the broadcast transmission system 100 transmits multimedia information 600b via a communication line 400, which may be a communication network such as the Internet. Then, the reception appliance 200 receives the multimedia information 600a via the antenna 500. In addition, the reception appliance 200 receives the multimedia information 600b via the communication line 400. Each of the multimedia information 600a and 600b is information containing television program information or the like.

Figure 2:
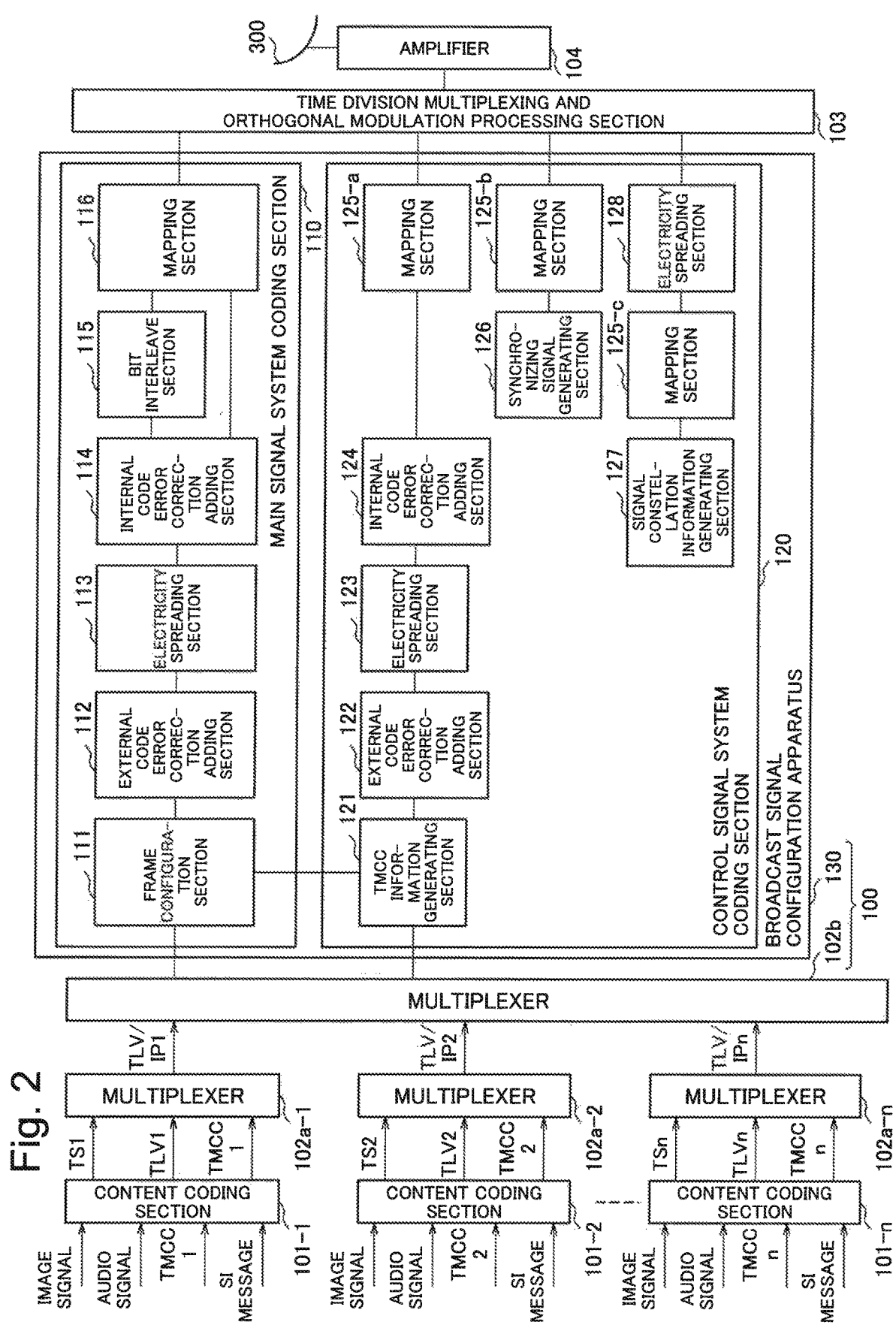
FIG. 2 is a block diagram illustrating an exemplary configuration of the broadcast signal configuration apparatus according to the first example embodiment of the present invention.

FIG. 2 is a block diagram illustrating an exemplary configuration of the broadcast signal configuration apparatus 130 according to the first example embodiment of the present invention. As illustrated in FIG. 2, the broadcast signal configuration apparatus 130 according to the first example embodiment of the present invention is placed between a multiplexer 102b and a time division multiplexing and orthogonal modulation processing section 103. The broadcast signal configuration apparatus 130 includes a main signal system coding section 110 and a control signal system coding section 120. Note that the multiplexer 102b is connected to content coding sections 101-1 to 101-n via the multiplexers 102a-1 to 102a-n. In addition, the time division multiplexing and orthogonal modulation processing section 103 is connected to an amplifier 104, and the amplifier 104 is connected to the antenna 300.

Note that, for example, the content coding sections 101-1 to 101-n and the multiplexers 102a-1 to 102a-n are installed in a broadcast station of each broadcast organization, and respectively input information for television broadcast of the corresponding broadcast organization, to the multiplexer 102b.

Then, the multiplexer 102b; the broadcast signal configuration apparatus 130, which includes the main signal system coding section 110 and the control signal system coding section 120; the time division multiplexing and orthogonal modulation processing section 103; the amplifier 104; and the antenna 300 are installed in a so-called uplink station.

Note that the broadcast signal configuration apparatus 130 is realized by a computer on which mounted are a central processing unit (CPU) and a single or a plurality of circuits, which perform processing under control of a program, for example.

The content coding sections 101-1 to 101-n encode input image signals, audio signals, TMCC signals, and service information (SI) messages, into streams in the format of an moving picture expert group (MPEG)-2 transport stream (TS) or of a type length value (TLV), and input the streams resulting by the encoding, into the multiplexers 102a-1 to 102a-n.

Note that a SI message includes a package access (PA) message, a program map table (PMT), or the like, which contain emergency warning descriptors having set thereto emergency warning system (EWS) conditions such as a value of start_end_flag indicating whether an emergency warning is being broadcasted, a code indicating whether the emergency warning broadcast is Type 1 or Type 2, and a regional code.

The multiplexers 102a-1 to 102a-n multiplexes, on one another, the streams input by the content coding sections 101-1 to 101-n connected thereto, and input the result to the multiplexer 102b.

The multiplexer 102b multiplexes, on one another, the streams input by the multiplexers 102a-1 to 102a-n, and inputs the result to the main signal system coding section 110. In addition, the multiplexer 102b inputs, to the control signal system coding section 120, a TMCC signal according to a transmission parameter used in transmitting the stream input to the main signal system coding section 110.

The main signal system coding section 110 configures a frame based on the input stream, and inputs a signal mapped using a predetermined modulation system, into the time division multiplexing and orthogonal modulation processing section 103.

In addition, the control signal system coding section 120 generates TMCC information, based on an input TMCC signal. The TMCC information will be described later. The control signal system coding section 120 configures a frame based on generated TMCC information and inputs the signal mapped using a predetermined modulation system, into the time division multiplexing and orthogonal modulation processing section 103.

The time division multiplexing and orthogonal modulation processing section 103 time division multiplexes, on one another, the signal input by the main signal system coding section 110 and the signal input by the control signal system coding section 120, and performs orthogonal modulation the result, thereby generating a modulated wave. Then, the time division multiplexing and orthogonal modulation processing section 103 inputs thus generated modulated wave, into the amplifier 104.

Then, the amplifier 104 amplifies the modulated wave generated by the time division multiplexing and orthogonal modulation processing section 103, and inputs the result into the antenna 300. The modulated wave is transmitted via the antenna 300, as multimedia information 600a.

Moreover, as illustrated in FIG. 2, the control signal system coding section 120 includes a TMCC information generating section 121, an external code error correction adding section 122, an electricity spreading section 123, an internal code error correction adding section 124, a mapping section 125-a, a synchronizing signal generating section 126, a mapping section 125-b, a signal constellation information generating section 127, a mapping section 125-c, and an electricity spreading section 128.

The TMCC information generating section 121 generates TMCC information indicating a modulation system or the like of each stream, based on the input TMCC signal.

The external code error correction adding section 122 generates a signal by processing to add an external code (BCH code), for error correction, to the TMCC information generated by the TMCC information generating section 121.

The electricity spreading section 123 generates a signal by processing the signal generated by the external code error correction adding section 122, to prevent a peak electricity of an orthogonal frequency division multiplexing (OFDM) signal from being excessive by successive 0 or 1.

The internal code error correction adding section 124 generates a signal by processing to add an internal code (low density parity check (LDPC) code), for error correction, to the signal generated by the electricity spreading section 123.

The mapping section 125-a performs π/2 shifting binary phase shift keying (BPSK) modulation on the signal generated by the internal code error correction adding section 124. Then, the signal after the modulation is input into the time division multiplexing and orthogonal modulation processing section 103.

The synchronizing signal generating section 126 generates a frame synchronizing signal for synchronizing frames and a slot synchronizing signal for synchronizing slots, and inputs these signals into the mapping section 125-b.

The mapping section 125-b performs π/2 shifting BPSK modulation on the signal generated by the synchronizing signal generating section 126. Then, the signal after the modulation is input into the time division multiplexing and orthogonal modulation processing section 103.

The signal constellation information generating section 127 generates signal constellation information indicating a signal constellation in an OFDM signal.

The mapping section 125-c modulates the signal constellation information using a modulation system which is either the π/2 shifting BPSK to 32 amplitude and phase shift keying (APSK), based on the TMCC information.

The electricity spreading section 128 generates a transmission signal constellation signal, by performing processing to add an electricity spreading signal to the signal constellation information modulated by the mapping section 125-c, to prevent a peak electricity of the OFDM signal from being excessive by successive 0 or 1. Then, the electricity spreading section 128 inputs the generated transmission signal constellation signal, into the time division multiplexing and orthogonal modulation processing section 103.

Also, as illustrated in FIG. 2, the main signal system coding section 110 includes a frame configuration section 111, an external code error correction adding section 112, an electricity spreading section 113, internal code error correction adding section 114, a bit interleave section 115, and a mapping section 116.

A stream resulting by encoding an image signal and an audio signal into the format of an MPEG-2 TS or a TLV by the content coding sections 101-1 to 101-n is input to the frame configuration section 111. Then, the frame configuration section 111 configures an input stream into a frame, based on the TMCC information generated by the TMCC information generating section 121.

The external code error correction adding section 112 generates a transmission main signal, by performing processing to add an external code (BCH code), for error correction, to the frame configured by the frame configuration section 111. The transmission main signal is a signal, in a unit of slot, resulting by: processing to add an error correction external code and a stuff bit (for example, six "1" bits (111111)) being a bit string added to adjust the number of bits in the transmission main signal, to a main signal being either the signal resulting by linking the TS packets excluding the leading one byte or the signal resulting by linking the TLV packets, and the slot header being a control information region related to the main signal; and adding an electricity spreading signal and performing error correction internal code processing thereon.

The electricity spreading section 113 generates a transmission main signal, by processing the transmission main signal generated by the external code error correction adding section 112, to prevent a peak electricity of an OFDM signal from being excessive by successive 0 or 1.

The internal code error correction adding section 114 generates a transmission main signal, by processing to add an internal code (LDPC code), for error correction, to the transmission main signal generated by the electricity spreading section 113.

The bit interleave section 115 bit-interleaves the transmission main signal of a stream indicated to have a modulation system of 8 phase shift keying (PSK), 16 APSK, or 32 PSK by the TMCC information generated by the TMCC information generating section 121, and inputs the result into the mapping section 116.

The mapping section 116 modulates the transmission main signal by using either one of the modulation systems of π/2 shifting BPSK to 32 APSK, based on the TMCC information. Then, the modulated transmission main signal is input into the time division multiplexing and orthogonal modulation processing section 103.

The time division multiplexing and orthogonal modulation processing section 103 generates an output signal by performing time division multiplexing and orthogonal modulation on the input signals with respect to each other. Then, the time division multiplexing and orthogonal modulation processing section 103 inputs the generated output signal into the amplifier 104.

Figure 3:
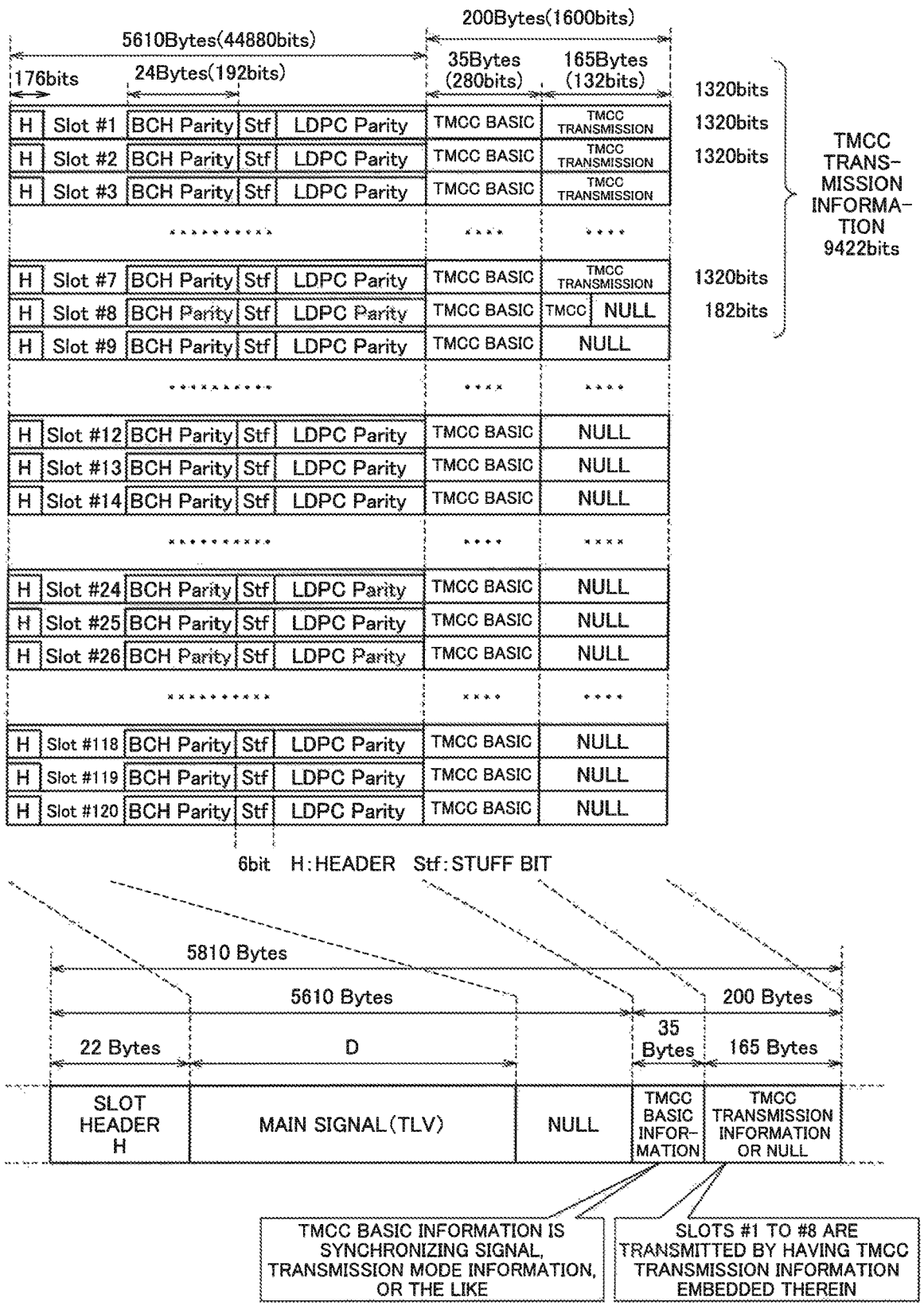
FIG. 3 is an explanatory drawing illustrating an exemplary configuration of a frame configured by a frame configuration section.

FIG. 3 is an explanatory drawing illustrating an exemplary configuration of a frame configured by the frame configuration section 111. Note that the configuration illustrated in FIG. 3 is an example, and the configuration may be different from this exemplary configuration. As illustrated in FIG. 3, a frame is configured to contain, in each of first to 120th slots, a transmission main signal and a transmission TMCC signal.

Then, the frame is configured to contain, in each slot, a transmission main signal in the 5610 highest-rank byte (44880 bits) region, and a transmission TMCC signal in the 200 lowest-rank byte (1600 bits) region. Note that in each slot of a frame, the 5610 highest-rank byte (44880 bits) region is referred to as a transmission main signal region, and the 200 lowest-rank byte (1600 bits) region is referred to as a transmission TMCC signal region.

In each slot, the transmission main signal region contains a 176 bit slot header, a main signal which is linked TLV packets, an error correction code, and a stuff bit (indicated by "Stf" in FIG. 3). Note that as illustrated in FIG. 3, the error correction code contains a BCH parity bit of 24 bytes (192 bits), and a LDPC parity bit. In addition, a stuff bit is a bit string added to adjust the number of bits in a transmission main signal and is configured by six "1" bits (111111). In addition, the region of the slot header is a control information region related to a main signal.

In addition, in each slot, the transmission TMCC signal region contains TMCC basic information in the 35 highest-rank bytes (280 bits), and TMCC transmission information or NULL in the 165 lowest-rank bytes (1320 bits). Note that as illustrated in FIG. 3, in the transmission TMCC signal region in the first to seventh slots, the 165 lowest-rank bytes (1320 bits) contain TMCC transmission information. In addition, TMCC transmission information is contained in the 182 highest-rank bits in the 165 lowest-rank bytes (1320 bits) in the transmission TMCC signal region in the eighth slot, and the remaining part thereof is NULL. Furthermore, the 165 lowest-rank bytes (1320 bits) in the transmission TMCC signal region in the ninth to 120th slots are NULL.

Next, the TMCC basic information will be explained. Here, the TMCC basic information stated below may be to realize a function by recovering the TMCC basic information at the side of the reception appliance or may be to realize a function by being operated at the transmission side such as the broadcast organization (specifically, a transmission system of the broadcast organization, for example, corresponding to the multiplexers 102*a*-1 to 102*a*-*n* illustrated in FIG. 2, for example. In the following description, too, "broadcast organization" specifically means a delivery system of the broadcast organization, for example, corresponding to the multiplexers 102*a*-1 to 102*a*-*n* illustrated in FIG. 2, for example) and an uplink station. In addition, the TMCC basic information does not necessarily have to be generated as a broadcast signal delivered to the reception appliance.

In addition, the TMCC basic information may be used as information to be operated as an inter-station signal between the transmission-side broadcast organization and uplink station. Note that the broadcast organization may be required to transmit a TLV stream to an uplink station in accordance with a prescribed signal format.

In addition, in a super high vision (SHV) broadcast system or the like, the TMCC basic information may be recovered at the reception appliance at the transmission side to be output as TLV, to realize a function. Note that such processing load alleviation at the transmission system side is an advantageous effect of the present invention, which makes it possible to alleviate the processing load at the TLV combining apparatus at the uplink station, for example.

As illustrated in FIG. 3, the TMCC basic information is made up of 35 bytes (280 bits). Note that the TMCC basic information indicates information related to a transmission main signal in the frame transmitted two frames after the frame that contains the TMCC basic information itself. Then, the time division multiplexing and orthogonal modulation processing section 103, having received the transmission main signal, determines the head of the frame, and the valid/invalid slot information, based on the content set to the 0th to fifth bytes in the TMCC basic information contained in the frame transmitted two frames before the frame that contains this TMCC basic information, and performs transmission path processing. In the present example, as described earlier, the TMCC basic information is made up of 35 bytes (280 bits), and therefore can contain more information than the TMCC basic information of 8 bytes under the TR-B15 operational rule.

FIG. 4A to FIG. 4C are explanatory drawings illustrating content of TMCC basic information. As illustrated in FIG. 4A, the 0th byte (illustrated as "0" in the byte column in FIG. 4A, and this also applies hereinafter.) to the second byte in the TMCC basic information respectively have a number of bits in accordance with the synchronizing signal.

Specifically, the 0th to second bytes are set to indicate mutually different identifiers among the slot corresponding to the head of each frame and the other slots, for example. More specifically, 52F886h is set to the 0th byte to the second byte of the TMCC basic information in the slot corresponding to the head of each frame, as an identifier to perform frame synchronization. In addition, 36715Ah is set to the 0th byte to the second byte of the TMCC basic information in the slot not corresponding to the head of each frame, as an identifier to perform slot synchronization.

In the above-described configuration, the 0th byte to the second byte, i.e., 3 bytes, are used for frame synchronization and slot synchronization. Therefore, in comparison to the case in which a smaller number of bytes is used to perform frame synchronization and slot synchronization, the bit error resistance can be favorably improved.

In addition, as illustrated in FIG. 4A, "11111111" is set to the third byte. As illustrated in FIG. 4A, at the fourth byte, a value corresponding to an attribute indicating whether the slot is a valid slot or an invalid slot is set to the 0th bit to the third bit. Also, as illustrated in FIG. 4A, at the fourth byte, transmission mode information for each slot is set to the fourth bit to the seventh bit.

In the fourth bit to the seventh bit at the fourth byte, transmission mode information of the slot (also simply referred to as "the corresponding slot" hereinafter) for the corresponding slot number of the frame transmitted two frames after the frame that contains that slot is set. Therefore, without necessitating to collect the values corresponding to the number of allocated slots for the transmission modes respectively set to the later-described 15th, 17th, 19th, 21st, 23rd, 25th, 27th, 29th bytes, it is possible to identify the transmission modes of the corresponding slots. Therefore, the processing load of the reception appliance can be favorably alleviated.

Specifically, assume a case in which a value corresponding to the number of allocated slots for the transmission mode 1 being ten is set to the later-described 15th byte, and a value corresponding to the number of allocated slots for the transmission mode 2 being five is set to the 17th byte. In that case, it can also be considered that, so as to identify that the transmission mode of the first to tenth slots is the transmission mode 1 and that the transmission mode of the 11th to 16th slot is the transmission mode 2, collection of the value set to the 15th byte and the value set to the 17th byte is required.

However, in the present example, the transmission mode information for the corresponding slots is set to the fourth bit to the seventh bit of the fourth byte. Therefore, without necessitating to collect the values corresponding to the number of allocated slots for the transmission modes respectively set to the later-described 15th, 17th, 19th, 21st, 23rd, 25th, 27th, 29th bytes, it is possible to identify the transmission modes of the corresponding slots.

In addition, at the fourth byte, a value corresponding to an attribute indicating whether the slot is a valid slot or an invalid slot is set to the 0th bit to the third bit. Therefore, without necessitating to collect the values corresponding to the modulation systems respectively set to the later-described 14th, 16th, 18th, 20th, 22nd, 24th, 26th, 28th bytes, or the values corresponding to the number of allocated slots respectively set to the later-described 15th, 17th, 19th, 21st, 23rd, 25th, 27th, 29th bytes, it is possible to identify whether the corresponding slot is a valid slot or an invalid slot, to favorably alleviate the processing load at the reception appliance.

Specifically, the transmission mode and the modulation system for each slot are identified, based on the values corresponding to the modulation systems respectively set to the later-described 14th, 16th, 18th, 20th, 22nd, 24th, 26th, 28th bytes, and the values corresponding to the number of allocated slots for the transmission modes respectively set to the later-described 15th, 17th, 19th, 21st, 23rd, 25th, 27th, 29th bytes. For example, assume that the value corresponding to BPSK is set to the fourth bit to the seventh bit of the 14th byte, and the value corresponding to 16 APSK is set to the fourth bit to the seventh bit of the 16th byte. In addition, assume that the value corresponding to the first slot to the fifth slot is set to the 15th byte, and the value corresponding to the sixth slot to the tenth slot is set to the 17th byte. In such a case, based on the values set to the 14th byte to the 17 byte, the modulation system for the first slot to the fifth slot is identified to be BPSK, and the modulation system for the sixth slot to the tenth slot is 16 APSK. In other words, it can also be considered that, so that the modulation system for the first slot to the fifth slot is identified to be BPSK, and the modulation system for the sixth slot to the tenth slot is 16 APSK, it is required to refer to the values set to the 14th byte to the 17th byte.

However, in the present example, because the transmission mode information for the corresponding slot is set to the fourth bit to the seventh bit of the TMCC basic information contained in each slot, the modulation systems of the corresponding slots can be easily identified, without necessitating to collect the values corresponding to the modulation systems respectively set to the later-described 14th, 16th, 18th, 20th, 22nd, 24th, 26th, 28th bytes, or the values corresponding to the number of allocated slots respectively set to the later-described 15th, 17th, 19th, 21st, 23rd, 25th, 27th, 29th bytes.

In addition, if a modulation system is set by deeming five slots as one unit, when assuming that the modulation system is BPSK, among the five slots constituting one unit, the first slot is a slot corresponding to the transmission main signal, and the second slot to the fifth slot are slots for error correction. In other words, the first slot is a valid slot, while the second to fifth slots are invalid slots. In addition, when assuming that the modulation system set by deeming five slots as one unit is 16 APSK, then among the five slots constituting one unit, the first slot to the fourth slot are slots corresponding to the transmission main signal, and the fifth slot is a slot for error correction. In other words, the first to fourth slots are valid slots, while the fifth slot is an invalid slot. Therefore, it can also be considered that, so as to identify whether each slot is a valid slot or an invalid slot, processing is required, which is based on the values corresponding to the modulation systems respectively set to the later-described 14th, 16th, 18th, 20th, 22nd, 24th, 26th, 28th bytes, and the values corresponding to the number of allocated slots respectively set to the later-described 15th, 17th, 19th, 21st, 23rd, 25th, 27th, 29th bytes.

However, in the present example, a value corresponding to an attribute indicating whether the slot is a valid slot or an invalid slot is set to the 0th bit to the third bit of the fourth byte. Therefore, by referring to the 0th bit to the third bit of the fourth byte, it is easy to identify whether the corresponding slot is a valid slot or an invalid slot.

As illustrated in FIG. 4A, a value corresponding to the slot counter is set to the 0th bit to the sixth bit of the fifth byte. Specifically, the head slot of a frame is set to be 0 (for example, 0000000), and the value for the slots thereafter is incremented one by one in the order of the slots, for example. Therefore, "0000001" will be set to the 0th bit to the sixth bit of the fifth byte in the first slot, and "1110111" will be set to the 0th bit to the sixth bit of the fifth byte in the 120th slot.

According to the above-stated configuration, it becomes possible to easily detect abnormality occurring on the transmission path, by detecting discontinuity such as "deletion" or "replacement in the order" in the values of the continuous slots according to the slot counter. This effect cannot be obtained by a system based on the STD-B44 standard specification, in which the frame configuration of the TLV transmission main signal does not contain information related to the slot number.

In addition, as illustrated in FIG. 4A, a value corresponding to the frame head flag is set to the seventh bit of the fifth byte, so as to identify the head frame.

According to the stated configuration, it is possible to identify the head frame, only based on the value set to one bit, which corresponds to the seventh bit of the fifth byte, which can favorably alleviate the processing load at the reception appliance.

As illustrated in FIG. 4B, a value corresponding to the pointer/slot information top pointer indicating the first packet's head position of the corresponding slot is set to the sixth byte and the seventh byte. In addition, as illustrated in FIG. 4B, a value corresponding to the pointer/slot information last pointer indicating a value resulting by adding 1 to the number of bytes from the slot head, excluding the final byte header of the final positioning completed packet in the corresponding slot is set to the eighth byte and the ninth byte.

Note that since the TLV packet in the present example has a variable length, the sixth to ninth bytes indicate the top pointer and the last pointer of the corresponding slot that is required. Note that, a configuration of indicating the top pointer and the last pointer of the corresponding slot can also be applied to a TS packet, which has a fixed length, just as in the case of the sixth to ninth bytes in the present example.

Figure 5:
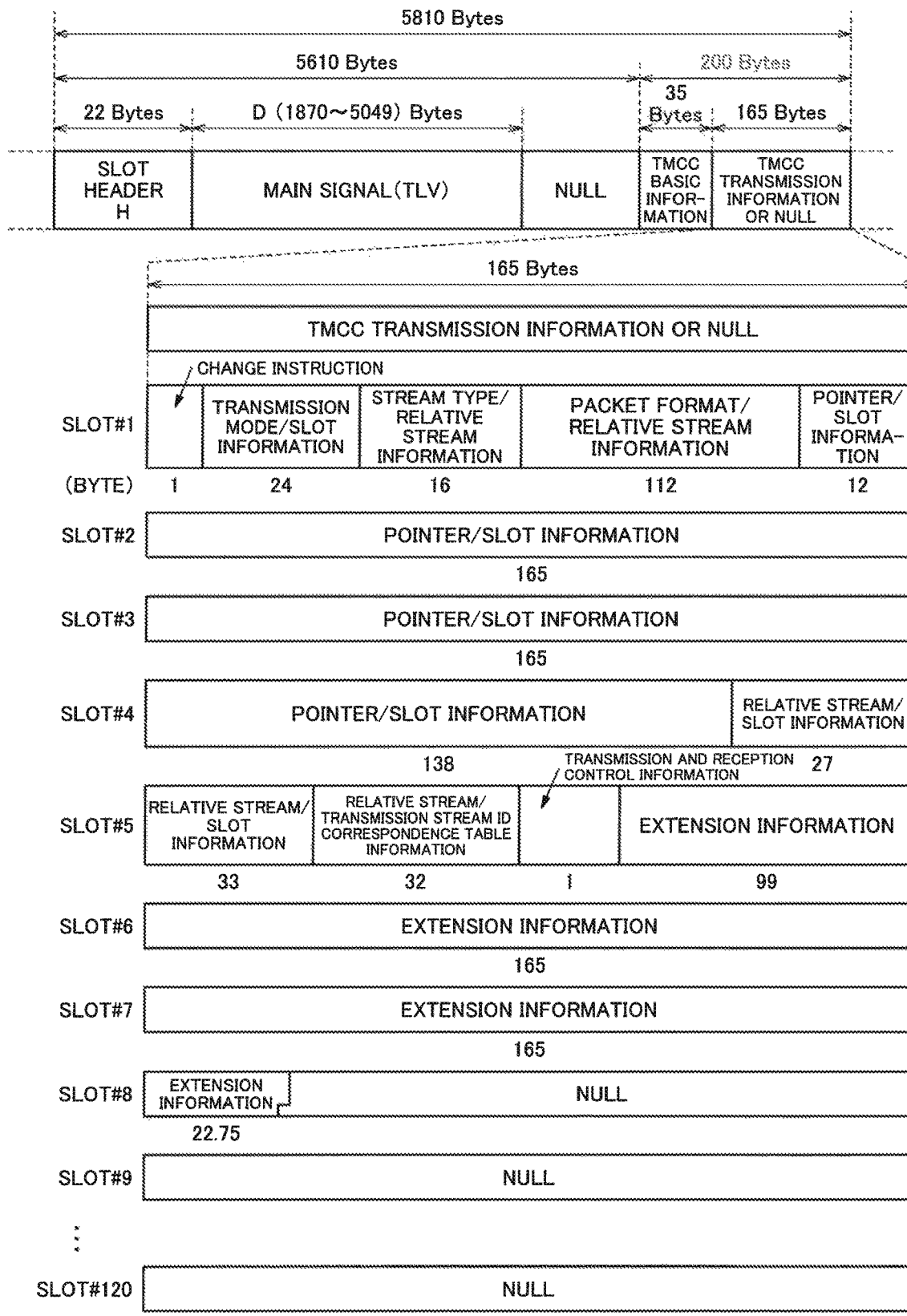
FIG. 5 is an explanatory drawing illustrating an exemplary configuration of the 165 lowest-rank bytes in the transmission TMCC signal region.

In addition, the top pointer and the last pointer of the corresponding slot as indicated in the sixth to ninth bytes are also indicated by the pointer/slot information of the TMCC transmission information illustrated in FIG. 5 which will be described later, for example. However, as illustrated in FIG. 5, the TMCC transmission information's pointer/slot information is included in the second slot to the fourth slot. Therefore, the information indicating the top pointer and the last pointer in the first slot to the 120th slot in the TMCC transmission information is contained in the second slot to the fourth slot. Thus, when a problem occurs in transmission or reception at the second slot to the fourth slot, the top pointer or the last pointer of the remaining slots will not be indicated by the TMCC transmission information, and therefore has a possibility of not being able to be decoded at the reception side. However, in the present example, the sixth to ninth bytes of the TMCC basic information indicate the top pointer and the last pointer of the corresponding slot. Therefore, even when there is a problem in transmission or reception at any of the first slot to the 120th slot, it is possible to prevent any effect on the slots other than the corresponding slot.

As illustrated in FIG. 4B, a value corresponding to a switch control signal indicating the concluding status of the positioning completed packet in the corresponding slot is set to the tenth byte. Specifically, assume a case in which a broadcast signal configuration apparatus of one system, being one of the broadcast signal configuration apparatuses 130, and a broad signal configuration apparatus of two systems, being the other of the broadcast signal configuration apparatuses 130, are prepared. It is also assumed that it is configured so that the first slot to the 60th slot are transmitted using the broadcast signal configuration apparatus of one system, and the 61st slot to the 120th slot are transmitted using the broadcast signal configuration apparatus of two systems. In other words, under this assumption, it is assumed to have a configuration, in which, between the timing at which the 60th slot is transmitted and the timing at which the 61st slot is transmitted, the broadcast signal configuration apparatus 130 used for data transmission is switched from the broadcast signal configuration apparatus of one system, being one of the broadcast signal configuration apparatuses 130, to the broad signal configuration apparatus of two systems, being the other of the broadcast signal configuration apparatuses 130.

If such a configuration is adopted, when the TLV data are assumed to be arranged over the 60th slot to the 61st slot, the TLV data cannot be appropriately decoded at the reception side.

In view of this, in the present example, a value corresponding to a switch control signal indicating the concluding status of the positioning completed packet in the (that) corresponding slot is set to the tenth byte in the TMCC basic information. Specifically, so as to facilitate switching of the broadcast signal configuration apparatus 130 used for data transmission in the next slot head, from the broadcast signal configuration apparatus of one system, being one of the broadcast signal configuration apparatuses 130, to the broad signal configuration apparatus of two systems, being the other of the broadcast signal configuration apparatuses 130, 1 is set to the 0th bit of the tenth byte of the TMCC basic information when the corresponding slot (packet) is concluded, and 0 is set to the 0th bit of the tenth byte of the TMCC basic information when the corresponding slot (packet) is not concluded and switching is impossible.

Thus, by referring to the 0th bit of the tenth byte of the TMCC basic information, it is possible to appropriately determine whether it is possible to switch from the broadcast signal configuration apparatus of one system, being one of the broadcast signal configuration apparatuses 130, to the broad signal configuration apparatus of two systems, being the other of the broadcast signal configuration apparatuses 130.

As illustrated in FIG. 4B, "0" is set to the 0th bit to the third bit of the 11th byte, and a value corresponding to uplink control information indicating side diversity implementation frame instruction and main and sub stations instructions is set to the fourth bit to the sixth bit, and a value corresponding to a start control signal used in starting the reception appliance at the time of emergency warning broadcast is set to the seventh bit. Specifically, in the start control signal, the seventh bit in the 11th byte is set to 1 during the emergency warning broadcast and is normally set to 0.

As illustrated in FIG. 4B, "11111111" is set to the 12th byte and the 13th byte.

As illustrated in FIG. 4C, in the 14th byte, a value corresponding to the coded rate of the transmission mode 1 in the slot licensed to the broadcast organization is set to the 0th to the third bit, and a value corresponding to the modulation system of the transmission mode 1 is set to the fourth bit to the seventh bit.

As illustrated in FIG. 4C, a value corresponding to the number of allocated slots for the transmission mode 1 is set to the 15th byte.

As illustrated in FIG. 4C, respective values corresponding to the modulation system, the coded rate, and the number of allocated slots for the transmission modes 2 to 7 in the slot licensed to the broadcast organization are set to the 16th byte to the 27th byte. As illustrated in FIG. 4C, a value corresponding to the coded rate of the transmission mode 8 is set to the 0th to the third bit of the 28th byte, and a value corresponding to the modulation system of the transmission mode 8 is set to the fourth bit to the seventh bit. As illustrated in FIG. 4C, a value corresponding to the number of allocated slots of the transmission mode 8 is set to the 29th byte.

Specifically, values corresponding to the coded rates of the transmission modes 2 to 8 are set to the 0th bit to the third bit of the 16th, 18th, 20th, 22nd, 24th, 26th, 28th byte, for example, and respective values corresponding to the modulation systems of the transmission modes 2 to 8 are set to the fourth bit to the seventh bit. In addition, values corresponding to the number of allocated slots of the transmission modes 2 to 7 are set to the 17th, 19th, 21st, 23rd, 25th, 27th, 29th bytes.

Note that each piece of information indicated by each value set to the 14th byte to the 29 byte is also contained in the TMCC transmission information. However, the TMCC transmission information is information transmitted when the first slot to the eighth slot in one frame is used. If this portion of the TLV packet is deleted, it is likely that the TMCC information corresponding to this frame is deleted. If this happens, it is possible that all the frames cannot be decoded at the reception side at which the frames are received.

As opposed to this, in the present example, the TMCC basic information contained in each slot in one frame is used to transmit each piece of information indicated by each value set to the 14th byte to the 29th byte. Therefore, it is possible to favorably improve the error resistance of the TMCC information due to the deletion of the TLV packet, especially the deletion of the first slot to the eighth slot.

As illustrated in FIG. 4C, the value of the eight highest-rank bits, in the transmission stream ID transmitted in the corresponding slot, is set to the 30th byte.

As illustrated in FIG. 4C, the value of the eight lowest-rank bits, in the transmission stream ID transmitted in the corresponding slot, is set to the 31st byte.

As illustrated in FIG. 4C, "11111111" is set to the 32nd byte to the 34th byte.

Note that, as information delivered from the broadcast organization so as to generate TMCC (specifically, TMCC transmission information, for example) in an uplink station, the pointer/slot information indicated by the sixth byte to the ninth byte, the start control signal indicated by the eleventh byte, the modulation system, the coded rate, and the number of allocated slots indicated by the 14th byte to the 29th byte, and the transmission stream ID indicated by the 30th byte to the 31st byte are used, among the above-explained TMCC basic information, for example.

In addition, in the uplink station, from among the above-stated TMCC basic information delivered from the broadcast organization, for example, the synchronization information indicated by the 0th byte to the second byte, the transmission mode information for each slot and the attribute information for each slot indicated by the fourth byte, the frame head flag and the slot counter indicated by the fifth byte, and the switch control signal indicated by the tenth byte may be used to generate TMCC (specifically, TMCC transmission information, for example).

Using these pieces of information, an effect of improving the error resistance in TMCC generation (specifically, generation of TMCC transmission information, for example) is achieved in the uplink station; in addition, an effect of alleviating the processing load in the TLV combining apparatus (specifically, corresponding to the multiplexer 102b illustrated in FIG. 2) can be achieved in the uplink station.

In addition, it is also possible, in the processing in the uplink station, specifically, a TLV stream to be transmitted from the broadcast organization to the uplink station and the TMCC basic information related to that TLV stream may be used in generating TMCC (specifically, TMCC transmission information, for example) in the uplink station. Note that setting in each byte as described above is merely one example, and it is needless to say that each byte can be appropriately set depending on each case.

FIG. 5 is an explanatory drawing illustrating an exemplary configuration of the 165 lowest-rank bytes in the transmission TMCC signal region. As illustrated in FIG. 5, to the first slot, values corresponding to a change instruction, transmission mode/slot information, stream type/relative stream information, packet format/relative stream information, and a part of pointer/slot information are set, from among the TMCC transmission information.

In addition, as illustrated in FIG. 5, to the second slot to the fourth slot, the values corresponding to the remaining part of the pointer/slot information are set.

As illustrated in FIG. 5, a value corresponding to a part of the relative stream/slot information is set to the fourth slot. In addition, to the fifth slot, values corresponding to a remaining part of the relative stream/slot information, the relative stream/transmission stream ID correspondence table information, the transmission and reception control information, and a part of extension information are set.

As illustrated in FIG. 5, to the sixth slot through a part of the eighth slot, values corresponding to a remaining part of the extension information are respectively set.

The remaining part of the eighth slot through the 120th slot are denoted as NULL.

Figure 6:
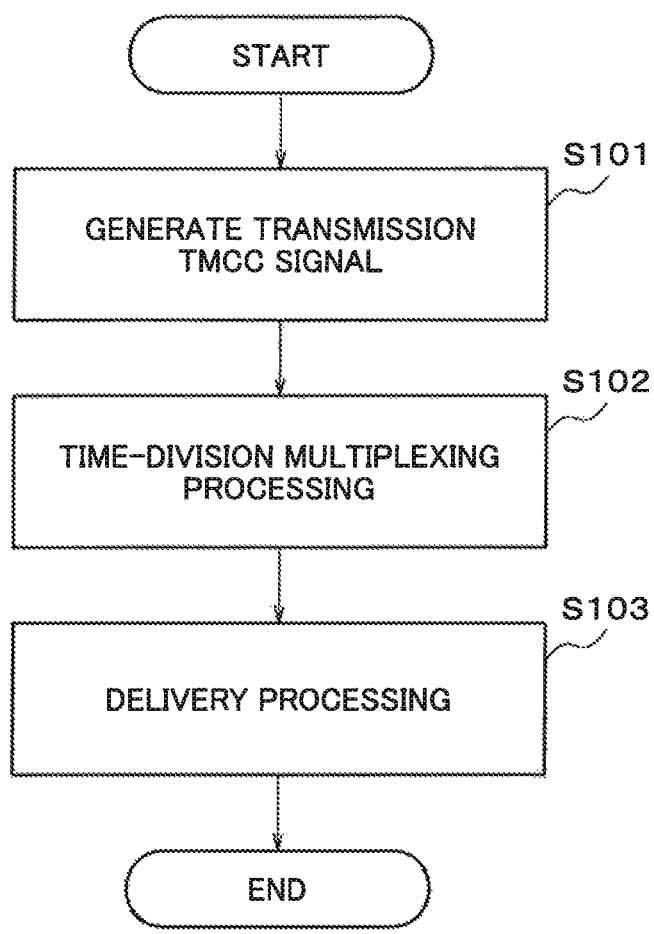
FIG. 6 is a flowchart illustrating an operation when a broadcast transmission system transmits information in accordance with emergency warning broadcast.

Next, the operation of the broadcast transmission system 100 is explained. FIG. 6 is a flowchart illustrating an operation when the broadcast transmission system 100 transmits information in accordance with emergency warning broadcast.

As illustrated in FIG. 6, the broadcast signal configuration apparatus 130 according to the first example embodiment of the present invention, upon input of a transmission parameter in transmitting each stream, generates a transmission TMCC signal, based on the input transmission parameter (Step S101).

More specifically, in the processing in Step S101, the broadcast signal configuration apparatus 130 according to the first example embodiment of the present invention generates a transmission TMCC signal in which a value corresponding to a start control signal (for example, "1"), indicating that emergency warning broadcast is being conducted, is set to the seventh bit of the 11th byte of the TMCC basic information in each slot (specifically, the first slot to the 120th slot, for example).

In addition, in the processing in Step S101, the broadcast signal configuration apparatus 130 according to the first example embodiment of the present invention generates a transmission TMCC signal in which a value corresponding to a start control signal (for example, "1"), indicating that emergency warning broadcast is being conducted, is set as TMCC transmission information, in a predetermined slot (the fifth slot in the present example).

That is, in the processing in Step S101, the broadcast signal configuration apparatus 130 according to the first example embodiment of the present invention generates a transmission TMCC signal in which a value corresponding to a start control signal (for example, "1"), indicating that emergency warning broadcast is being conducted, is set to the seventh bit of the 11th byte of the TMCC basic information in each slot (specifically, the first slot to the 120th slot, for example), and in which a value corresponding to a start control signal (for example, "1"), indicating that emergency warning broadcast is being conducted, is set as TMCC transmission information, in a predetermined slot (the fifth slot in the present example).

In addition, in this transmission TMCC signal, the broadcast signal configuration apparatus 130 according to the first example embodiment of the present invention has set a value corresponding to an attribute indicating whether the corresponding slot is a valid slot or an invalid slot, to the 0th bit to the third bit of the fourth byte of the TMCC basic information in each slot, in the processing in Step S101.

Furthermore, in this transmission TMCC signal, the broadcast signal configuration apparatus 130 according to the first example embodiment of the present invention has set a value corresponding to the transmission mode of the corresponding slot, to the fourth bit to the seventh bit of the fourth byte of the TMCC basic information in each slot, in the processing in Step S101.

In this transmission TMCC signal, the broadcast signal configuration apparatus 130 according to the first example embodiment of the present invention has set a value corresponding to the slot counter, to the 0th bit to the seventh bit of the fifth byte of the TMCC basic information in each slot, in the processing in Step S101.

In addition, in this transmission TMCC signal, the broadcast signal configuration apparatus 130 according to the first example embodiment of the present invention has set a value corresponding to the switch control signal, to the tenth byte of the TMCC basic information in each slot, in the processing in Step S101.

Figure 7:
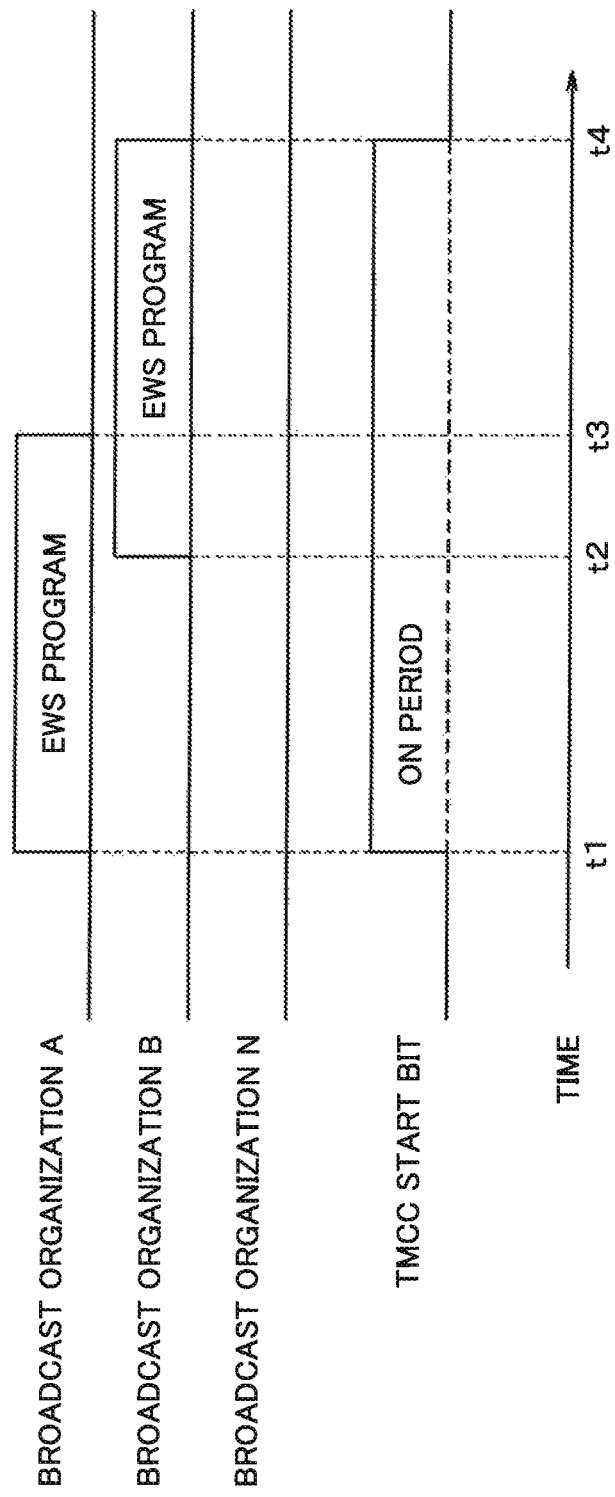
FIG. 7 is an explanatory drawing illustrating a value change according to a start control signal.

FIG. 7 is an explanatory drawing illustrating a value change according to a start control signal. In the present example, the value corresponding to the start control signal is assumed to change in accordance with the operational rule of the BS/broadband CS digital broadcast. As illustrated in FIG. 7, the broadcast organization A (specifically, the content coding section 101-a installed in a broadcast station of the broadcast organization A) generates a TMCC signal, to which a value corresponding to a start control signal indicating that emergency warning broadcast is being conducted from the time t1 to the time t3 is set and inputs the TMCC signal to the multiplexer 102b.

In addition, the broadcast organization B (specifically, the content coding section 101-B installed in a broadcast station of the broadcast organization B) generates a TMCC signal, to which a value corresponding to a start control signal indicating that emergency warning broadcast is being conducted from the time t2 to the time t4 is set and inputs the TMCC signal to the multiplexer 102b.

The broadcast organization N (specifically, the content coding section 101-n installed in a broadcast station of the broadcast organization N) generates a TMCC signal, to which a value (for example "0") corresponding to a start control signal indicating that normal broadcast is being conducted is set, and inputs the TMCC signal to the multiplexer 102b via the multiplexer 101-n.

Then, the multiplexer 102b multiplexes these signals on each other, and inputs the result to the broadcast signal configuration apparatus 130. The broadcast signal configuration apparatus 130 generates a transmission TMCC signal, to which a value corresponding to a fact that emergency warning broadcast is being conducted is set, while the TMCC start bit is set to a value corresponding to a start control signal indicating that emergency warning broadcast is being conducted in the TMCC signal delivered from any one of the broadcast organizations A to N.

Then, the time division multiplexing and orthogonal modulation processing section 103 time-division multiplexes the signal input by the main signal system coding section 110 and the transmission TMCC signal generated in the processing in Step S101 on each other, (Step S102), thereby generating a modulated wave.

The modulated wave generated by the multiplexing and the modulation in the processing in Step S102 is amplified by the amplifier 104, and is delivered via the antenna 300 (Step S103).

In the present example, from the time t1 to the time t4, a signal whose TMCC start bit is set to a value corresponding to a fact that emergency warning broadcast is being conducted is delivered.

Figure 8:
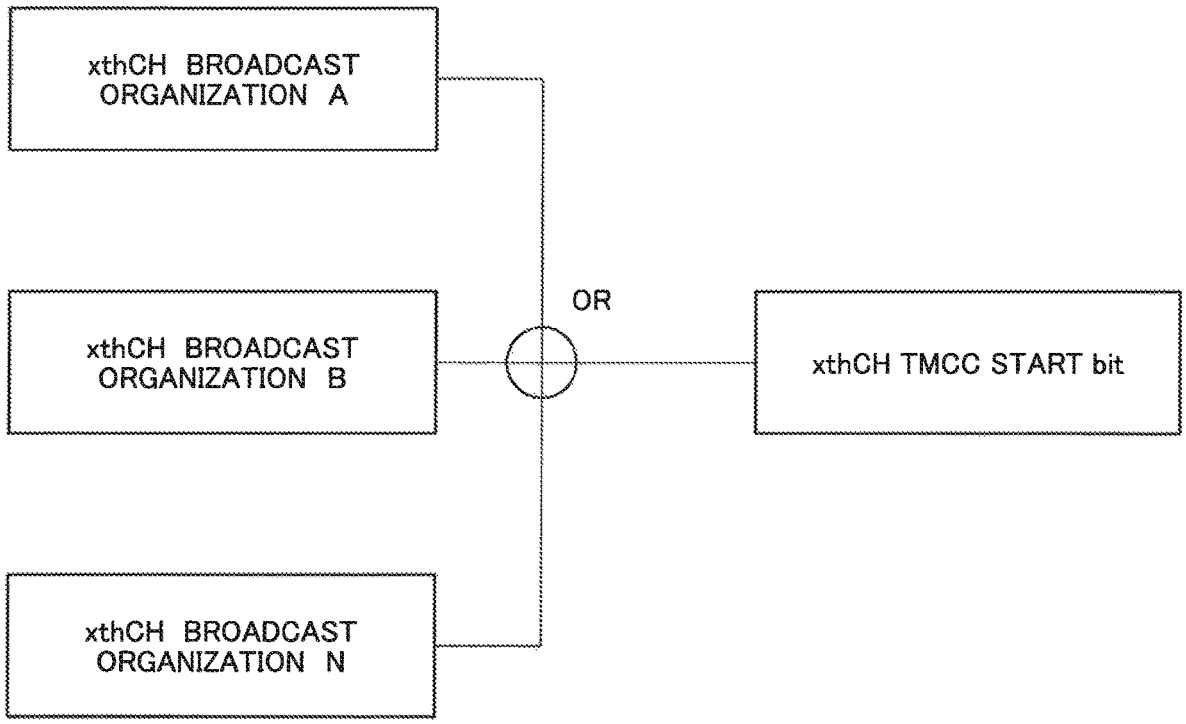
FIG. 8 is an explanatory drawing illustrating a method of setting a TMCC start bit.

FIG. 8 is an explanatory drawing illustrating a method of setting a TMCC start bit. In the present example, the TMCC start bit is assumed to be set in accordance with the operational rule of the BS/broadband CS digital broadcast. In the example illustrated in FIG. 8, in the xCHth, a value corresponding to a fact that emergency warning broadcast is being conducted is set and delivered, while a value corresponding to a start control signal indicating that emergency warning broadcast is being conducted in the TMCC signal delivered from any one of the broadcast organizations A to N is set.

The signal delivered by the processing in Step S103 is received by a reception appliance such as the reception appliance 200.

Then, the reception appliance reproduces the content, which is emergency warning broadcast based on a main signal processed by the main signal system coding section 110 which is delivered from each broadcast organization, and on which the PA message and the transmission TMCC signal are multiplexed in the processing in Step S102.

In addition, the reception appliance can refer to the information set to the 0th bit to the third bit of the fourth byte of the TMCC basic information contained in each slot of a frame, to identify whether the corresponding slot is a valid slot or an invalid slot.

Furthermore, the reception appliance can refer to the information set to the fourth bit to the seventh bit of the fourth byte of the TMCC basic information contained in each slot of a frame, to identify the transmission mode of the corresponding slot.

The reception appliance can refer to a value set to the 0th bit to the sixth bit of the fifth byte the TMCC basic information contained in each slot of a frame, to detect deletion of a slot or replacement in the order of slots.

In addition, the reception appliance receives a signal transmitted by the broadcast signal configuration apparatus 130 having been switched at an appropriate timing depending on a set value to the tenth byte of the TMCC basic information contained in each slot of a frame. Therefore, it is possible to appropriately decode data based on a received signal.

According to the present example embodiment, the broadcast signal configuration apparatus 130 generates a transmission TMCC signal in which a value corresponding to a start control signal is set to the TMCC basic information, when performing emergency warning broadcast. Then, the transmission TMCC signal is delivered after being multiplexed on a program stream. As illustrated in FIG. 3, unlike the TMCC transmission information, the TMCC basic information is contained in all the slots of a frame.

Therefore, the present example embodiment has a higher chance of delivering data corresponding to an emergency warning signal and more promptly, than in the case where a value corresponding to a start control signal is set in the TMCC transmission information stored in a part of the slots in a frame.

Specifically, in accordance with the operational rule of TR-B15, the TMCC basic information to which an emergency bit is set will be contained in a super frame after the super frame currently being transmitted, and therefore, it has to wait about 11 msec before being transmitted. However, according to the present example embodiment, because the TMCC basic information is contained in all the slots in a frame, the TMCC basic information to which a value corresponding to a start control signal is set can be delivered promptly in about 0.275 msec.

Therefore, according to the present example embodiment, data corresponding to an emergency warning signal can be transmitted more promptly, than in the case of notifying emergency warning broadcast by multiplexing it on the MPEG-2 TS in accordance with the operational rule of the BS/broadband CS digital broadcast.

In addition, according to the present example embodiment, the reception appliance having received a signal transmitted by the broadcast signal configuration apparatus 130 can refer to the information set to the 0th bit to the third bit of the fourth byte of the TMCC basic information contained in each slot of a frame, to identify whether the corresponding slot is a valid slot or an invalid slot. Therefore, it becomes possible to identify whether the corresponding slot is a valid slot or an invalid slot, without necessitating to collect the values corresponding to the modulation systems respectively set to the 14th, 16th, 18th, 20th, 22nd, 24th, 26th, 28th bytes, or the values corresponding to the number of allocated slots respectively set to the 15th, 17th, 19th, 21st, 23rd, 25th, 27th, 29th bytes, which favorably alleviates the processing load of the reception appliance.

Furthermore, according to the present example embodiment, the reception appliance having received a signal transmitted by the broadcast signal configuration apparatus 130 can refer to the information set to the fourth bit to the seventh bit of the fourth byte of the TMCC basic information contained in each slot of a frame, to identify the transmission mode of the corresponding slot. Therefore, it becomes possible to identify the transmission mode of the corresponding slot, without necessitating to collect the information set to each of the 15th, 17th, 19th, 21st, 23rd, 25th, 27th, 29th bytes, which favorably alleviates the processing load of the reception appliance. In addition, this will also restrict the number of reception appliances.

According to the present example embodiment, the reception appliance having received a signal transmitted by the broadcast signal configuration apparatus 130 can easily detect abnormality occurring on the transmission path, by detecting discontinuity such as "deletion" or "replacement in the order", based on the value set to the 0th bit to the sixth bit of the fifth byte of the TMCC basic information contained in each slot of a frame.

In addition, according to the present example embodiment, the reception appliance having received a signal transmitted by the broadcast signal configuration apparatus 130 can identify the head frame, only based on the value set to the seventh bit of the fifth byte of the TMCC basic information contained in each slot of a frame. Therefore, it is possible to more favorably alleviate the processing load of the reception appliance, than in a configuration in which more information is necessary to identify the head frame.

Furthermore, by solely referring to the value set to the 0th bit of the tenth byte of the TMCC basic information contained in each slot of a frame, the present example embodiment enables to appropriately determine whether it is possible to switch from the broadcast signal configuration apparatus of one system, being one of the broadcast signal configuration apparatuses 130, to the broad signal configuration apparatus of two systems, being the other of the broadcast signal configuration apparatuses 130.

Therefore, as described above, according to the present example embodiment, the TMCC basic information contained in each slot is configured to include information selected appropriately depending on the priority level, the processing load, or the like. Therefore, it becomes possible to promptly start emergency warning broadcast at the reception side, or to alleviate the processing load of the reception appliance.

In addition, not only an effect of alleviating the processing load at the reception side, the present example embodiment also has an effect of alleviating the processing load of a transmission apparatus or a transmission system at the transmission side, for example, an effect of alleviating the processing load of the TLV combining apparatus in the uplink station (specifically, an apparatus corresponding to the multiplexer 120b illustrated in FIG. 2, for example).

More specifically, assume an example in which, in a transmission system at the transmission side that includes at least any one of the multiplexers 102a-1 to n and the multiplexer 102b illustrated in FIG. 2, the multiplexer 102a-1 to n have generated the TMCC basic information, as described above. In this example, by setting the above-described information in the fourth bit to the seventh bit of the fourth byte of the TMCC basic information, the processing load of the multiplexer 102b can be favorably alleviated. In addition, by setting the above-described information in the 0th bit to the sixth bit of the fifth byte of the TMCC basic information, it becomes possible to easily detect abnormality occurring on the transmission path, by the multiplexer 102b detecting discontinuity such as "deletion" or "replacement in the order". Furthermore, by setting the above-described information in the seventh bit of the fifth byte of the TMCC basic information, the processing load of the multiplexer 102b can be favorably alleviated. By setting the above-described information in the 0th bit of the tenth byte of the TMCC basic information, the multiplexer 102b can appropriately determine whether it is possible to switch from the broadcast signal configuration apparatus of one system, being one of the broadcast signal configuration apparatuses 130, to the broad signal configuration apparatus of two systems, being the other of the broadcast signal configuration apparatuses 130.

As exemplified above using TLV data, the present example embodiment can be preferably applied to the advanced broadband satellite digital broadcast. However, each setting explained above is only an example; and therefore, it is needless to say that the present example embodiment can also be applied to various broadcast systems including terrestrial broadcast, as long as it uses similar configurations or information, or has a similar effect, not limited to the advanced broadband satellite digital broadcast.

Note that the direction of the arrows in the drawings is only an example and is not intended to limit the direction of the signals between the blocks.

Example Embodiment 2

Figure 9:
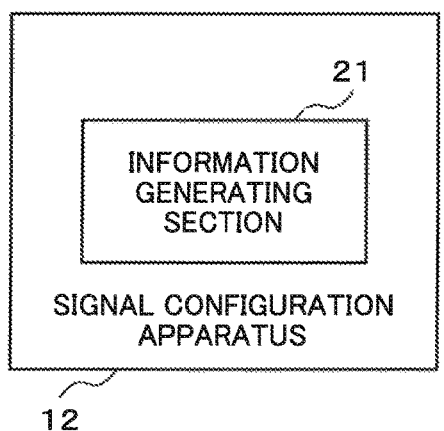
FIG. 9 is a block diagram illustrating an exemplary configuration of a signal configuration apparatus according to a second example embodiment of the present invention.

With reference to the drawings, the following explains a signal configuration apparatus 12 according to the second example embodiment of the present invention. FIG. 9 is a block diagram illustrating an exemplary configuration of a signal configuration apparatus 12 according to the second example embodiment of the present invention.

As illustrated in FIG. 9, the signal configuration apparatus 12 according to the second example embodiment of the present invention includes an information generating section 21. The information generating section 21 corresponds to the TMCC information generating section 121 in the first example embodiment illustrated in FIG. 2. Note that the signal configuration apparatus 12 that includes the information generating section 21 may correspond to the multiplexer 102a-1 to 102a-n, or may correspond to the multiplexer 102b, in the first example embodiment illustrated in FIG. 2, for example.

The information generating section 21 generates a frame so that each of a plurality of slots constituting a frame to be transmitted contains a start control signal corresponding to whether emergency warning broadcast is being conducted.

The present example embodiment has a higher chance of transmitting data corresponding to an emergency warning signal and more promptly, than in the case where a value corresponding to a start control signal is set in the TMCC transmission information stored in a part of the slots in a frame.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 12 signal configuration apparatus
21 information generating section
100 broadcast transmission system
101-a to 101-n transmission path coding section
102a-1 to 102a-n, 102b multiplexer
103 multiplexer
110 main signal system coding section
111 frame configuration section
112, 122 external code error correction adding section
113, 128 electricity spreading section
114, 124 internal code error correction adding section
115 bit interleave section
116, 125-a, 125-b, 125-c mapping section
120 broadcast signal configuration apparatus
121 TMCC information generating section
123 electricity spreading section
126 synchronizing signal generating section
127 signal constellation information generating section
130 content coding section
140 time division multiplexing and orthogonal modulation processing section
200 reception appliance
300, 500 antenna
400 communication network
600a, 600b multimedia information

The invention claimed is:

1. A signal configuration apparatus comprising:
a processor; and
memory storing executable instructions that, when executed by the processor, causes the processor to:
generate a frame to be transmitted so that each of a plurality of slots constituting the frame to be transmitted contains a start control signal corresponding to whether emergency warning broadcast is being conducted, wherein
the plurality of slots are set so that each of the slots contains slot-specific information and frame-common information,
the slot-specific information including transmission mode information indicating a transmission mode of each slot being a slot corresponding to each of the plurality of slots, and
the frame-common information being common to the plurality of slots and including information on a number of allocated slots for each transmission mode related to a slot corresponding to each of the plurality of slots of a frame which will be transmitted two frames after the frame that contains the slots.

2. The signal configuration apparatus according to claim 1, wherein
the frame is generated so that the start control signal is contained in all slots constituting the frame.

3. The signal configuration apparatus according to claim 1, wherein
when any information input from a plurality of coding sections indicates that emergency warning broadcast is being conducted, the frame is generated to contain the start control signal corresponding to a fact that the emergency warning broadcast is being conducted.

4. The signal configuration apparatus according to claim 1, wherein
the frame is generated so that each of the plurality of slots contains slot counter information indicating a value corresponding to an order in the frame.

5. The signal configuration apparatus according to claim 1, wherein
the frame is generated so that each of the plurality of slots contains transmission mode information indicating a transmission mode.

6. The signal configuration apparatus according to claim 1, wherein
the frame is generated so that each of the plurality of slots contains slot attribute information indicating whether each of the plurality of slots is a valid slot or an invalid slot.

7. A signal configuration system comprising:
the signal configuration apparatus according to claim 1; and
a multiplexer that multiplexes a plurality of input signals on each other and inputs the multiplexed input signals to the signal configuration apparatus.

8. A signal configuration method comprising:
generating a frame to be transmitted so that each of a plurality of slots constituting the frame to be transmitted contains a start control signal corresponding to whether emergency warning broadcast is being conducted, wherein
the plurality of slots are set so that each of the slots contains slot-specific information and frame-common information,
the slot-specific information including transmission mode information indicating a transmission mode of each slot being a slot corresponding to each of the plurality of slots, and
the frame-common information being common to the plurality of slots and including information on a number of allocated slots for each transmission mode related to a slot corresponding to each of the plurality of slots of a frame which will be transmitted two frames after the frame that contains the slots.

9. The signal configuration method according to claim 8, wherein
the frame is generated so that the start control signal is contained in all slots constituting the frame.

10. The signal configuration method according to claim 8, wherein
when any information input from a plurality of coding sections indicates that emergency warning broadcast is being conducted, the frame is generated to contain the start control signal corresponding to a fact that the emergency warning broadcast is being conducted.

11. The signal configuration method according to claim 8, wherein
the frame is generated so that each of the plurality of slots contains slot counter information indicating a value corresponding to an order in the frame.

12. The signal configuration method according to claim 8, wherein
the frame is generated so that each of the plurality of slots contains transmission mode information indicating a transmission mode.

13. The signal configuration method according to claim 8, wherein the frame is generated so that each of the plurality of slots contains slot attribute information indicating whether each of the plurality of slots is a valid slot or an invalid slot.

14. A frame configuration method comprising:
the signal configuration method according to claim 8; and
multiplexing a plurality of input signals on each other, wherein
the frame is generated based on the signals multiplexed in the multiplexing step.

15. A non-transitory storage medium storing therein a signal configuration program, the signal configuration program being for a computer to execute:
information generating processing for generating a frame to be transmitted so that each of a plurality of slots constituting the frame to be transmitted contains a start control signal corresponding to whether emergency warning broadcast is being conducted; and error correction processing for adding a code for error correction to the frame, wherein in the information generating processing, the plurality of slots so that each of the slots contains slot-specific information and frame-common information, the slot-specific information including transmission mode information indicating a transmission mode of each slot being a slot corresponding to each of the plurality of slots, and the frame-common information being common to the plurality of slots and including information on a number of allocated slots for each transmission mode related to a slot corresponding to each of the plurality of slots of a frame which will be transmitted two frames after the frame that contains the slots.

* * * * *